REVERTING CALL CIRCUIT

Filed March 5, 1957 5 Sheets-Sheet 1

INVENTOR.
ROBERT K. KAYE
BY [signature]
ATTORNEY

July 15, 1958 R. K. KAYE 2,843,673

REVERTING CALL CIRCUIT

Filed March 5, 1957 5 Sheets-Sheet 2

July 15, 1958 R. K. KAYE 2,843,673

REVERTING CALL CIRCUIT

Filed March 5, 1957 5 Sheets-Sheet 4

July 15, 1958 R. K. KAYE 2,843,673

REVERTING CALL CIRCUIT

Filed March 5, 1957 5 Sheets-Sheet 5

United States Patent Office 2,843,673
Patented July 15, 1958

2,843,673

REVERTING CALL CIRCUIT

Robert K. Kaye, Rochester, N. Y., assignor to General Dynamics Corporation, Rochester, N. Y., a corporation of Delaware Application March 5, 1957, Serial No. 643,979

11 Claims. (Cl. 179—17)

This invention relates to automatic telephone systems and more particularly to means for completing reverting calls.

It is desirable to provide for selectively signaling particular subscribers on an individual basis when telephone service is given to party lines, and it is old to provide for extending calls to party lines and for selecting among a plurality of signaling currents to signal called parties. Usually this selection of signaling currents depends upon the numerical values of digits, hereinafter called "Ringing Digits," incorporated into or appended to telephone directory numbers. On occasions, a subscriber may wish to call another subscriber on the same party line by a process which is hereinafter referred to as "Reverting Calls." Certain problems relating to reverting calls are due to the fact that a calling subscriber marks a called (his own) party line as busy, thus preventing a connection to it, and that signaling current may not be transmitted over a line as long as a calling subscriber is off-hook because the sound produced by such current may cause acoustic shock. Therefore, suitable equipment may be provided for recognizing reverting calls and for storing information relative to signaling currents, following which a calling subscriber may hang up and remove busy marking which may be applied to his line responsive to the reverting call that is in progress. After busy marking is removed, suitable equipment may transmit signaling current over the same party line responsive to the stored information.

An object of this invention is to provide new and improved reverting call circuits.

Another object of this invention is to provide for controlling signaling during reverting calls.

Still another object of this invention is to provide for storing information relative to ringing currents that are necessary to signal over party lines.

Yet another object of this invention is to provide for signaling both calling and called parties during reverting calls.

Briefly, this invention accomplishes the above cited and other objects by providing reverting call circuits that are seized responsive to prefix digits after which calling subscribers dial, first, their own ringing code selecting digit and then a called party's ringing code selecting digit. Suitable equipment in the reverting call circuit responds to these digit designations and connects markings which are extended from ringing control circuits to control the time of transmission of ringing current over the calling line to signal both the calling and called subscribers. Since time is a factor in the output of ringing current generators, a particular mode of ringing current is, therefore, selected. Although many different types of ringing control circuits may be utilized in the furtherance of this invention, one example of such a circuit may be found in the Elliott Patent 2,702,831, granted February 22, 1955.

Other objects and advantages of the subject invention will become apparent as the following description proceeds and the features of novelty which characterize the invention will be pointed out with particularity in the claims annexed to and forming part of this specification.

Next, reference is made to the attached drawings, in which.

Simple and specific terms are used in the following specification where possible to facilitate an understanding of the invention; however, it should be understood that the use of these simple and specific terms is not to act in any manner as a disclaimer of the full range of equivalents which is normally given under established rules of patent law. To illustrate, the attached drawings show the source of office potential by means of (+) and (—) signs. As in most telephone systems, the (+) terminal is described as being a ground potential; however, it should be understood that either this or any other suitable power supply may be used. Still further, the heavily inked rectangle 150 indicates that portion of the system which is shown in detail by means of Figs. 2–5. The remaining blocks of Fig. 1, that are shown by lightly inked rectangles, are items which are well known to those skilled in the art. Any suitable equipment may be used to provide the functions represented by these blocks. Further, the invention is described in connection with various minor switches when other means may be used, such as a chain of counting relays, for example. Quite obviously, other examples could be selected to illustrate the manner in which the specific terms that have been used are entitled to a wider range of equivalents.

BRIEF DESCRIPTION

Figure 1:
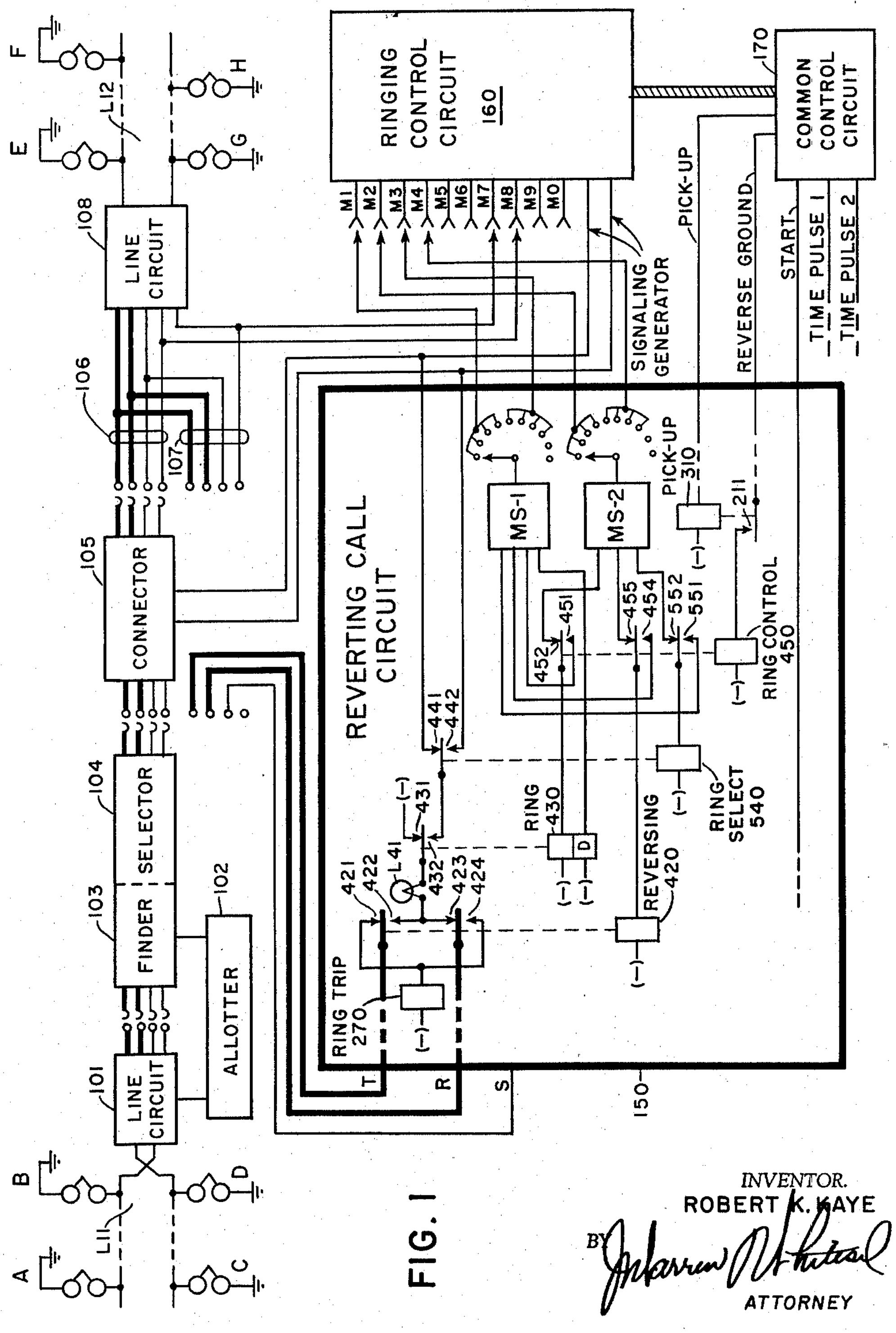
Fig. 1 shows by block diagram a telephone system which may utilize the subject invention.
Figure 2:
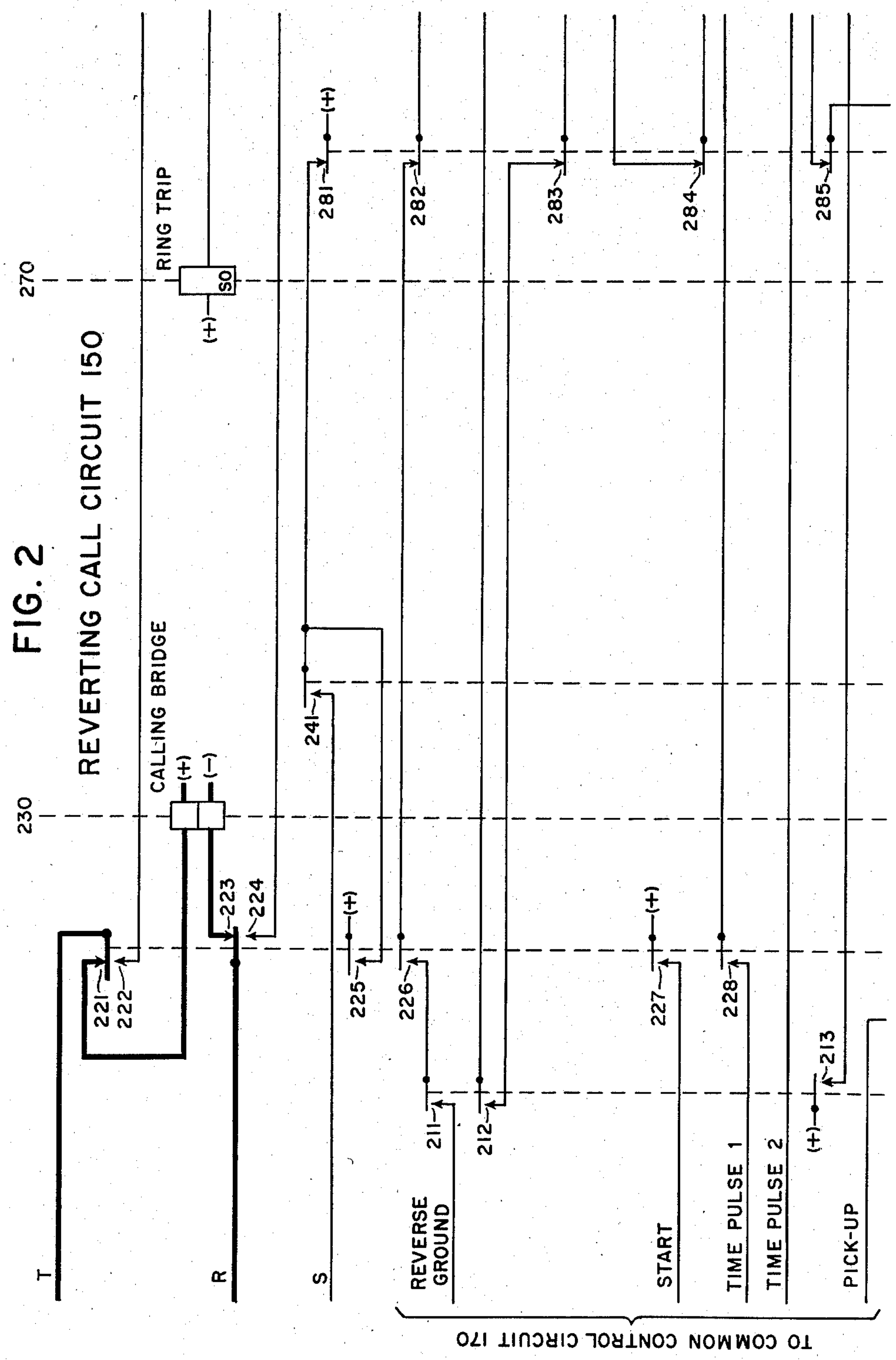
Figs. 2–5 show a reverting call circuit which is also shown in Fig. 1 by means of heavily inked rectangle 150; and, Fig. 6 shows the manner in which Figs. 2–5 should be joined to provide a complete and understandable circuit.
Figure 3:
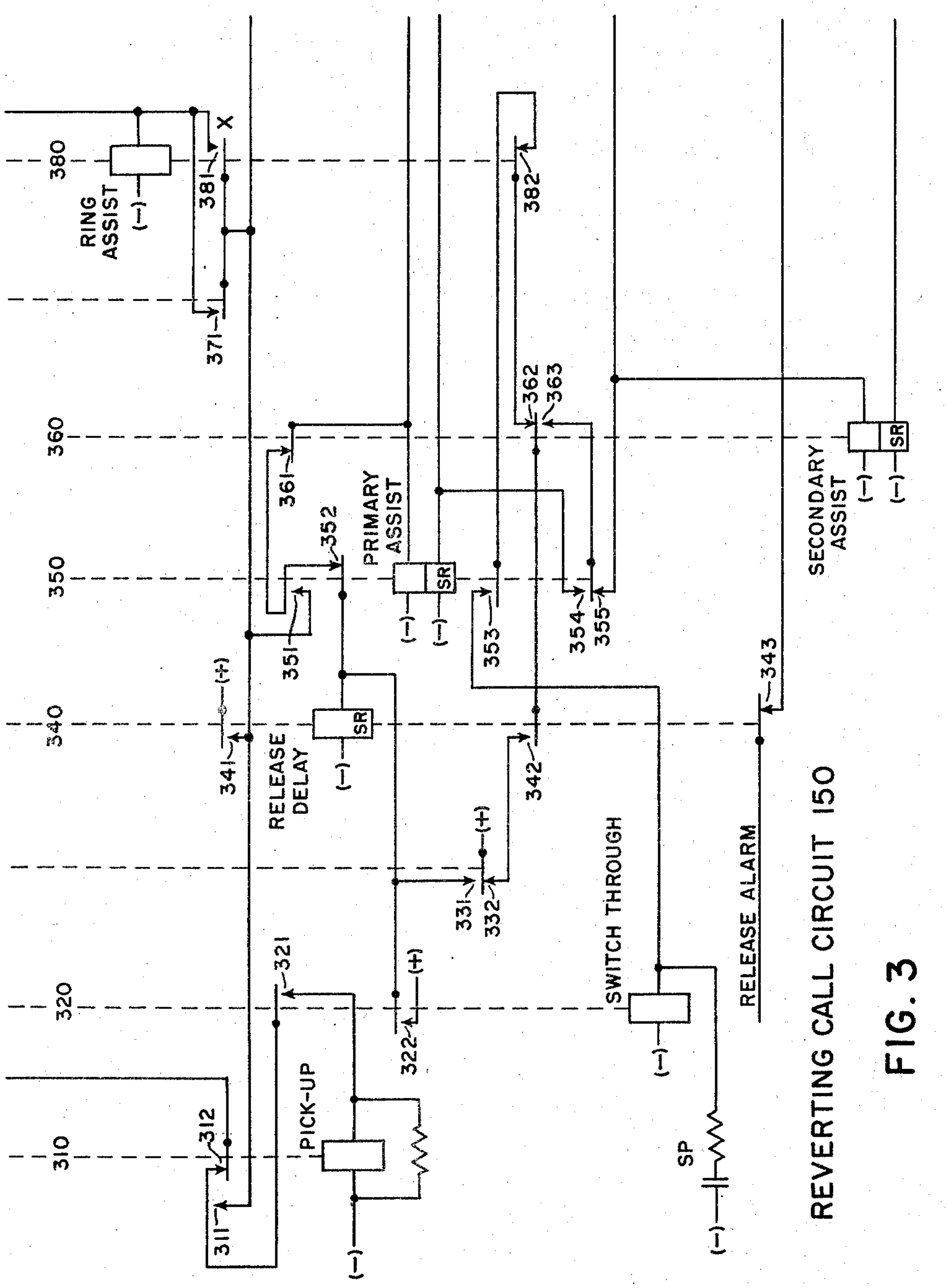
Figure 4:
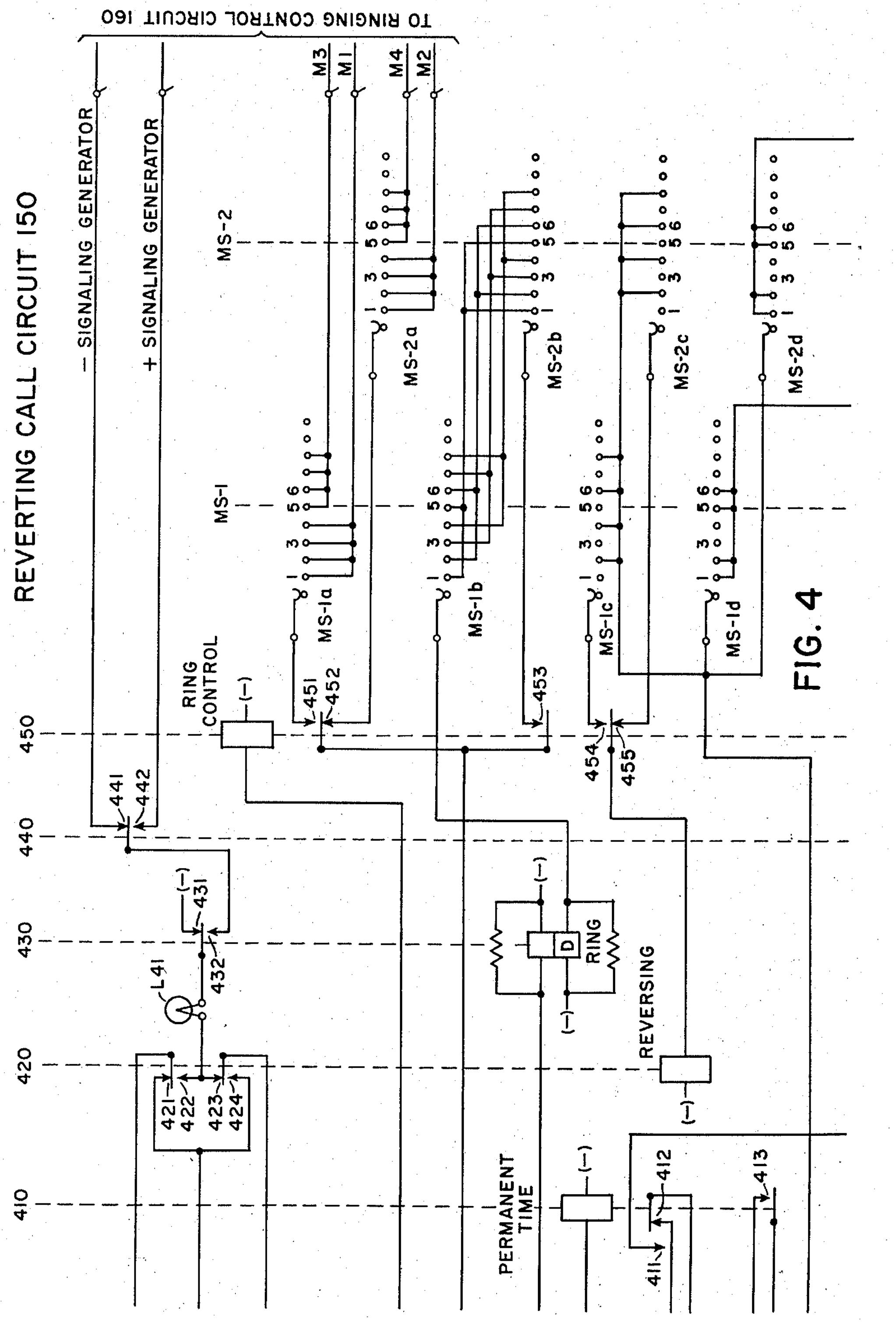
Figures 5, 6:
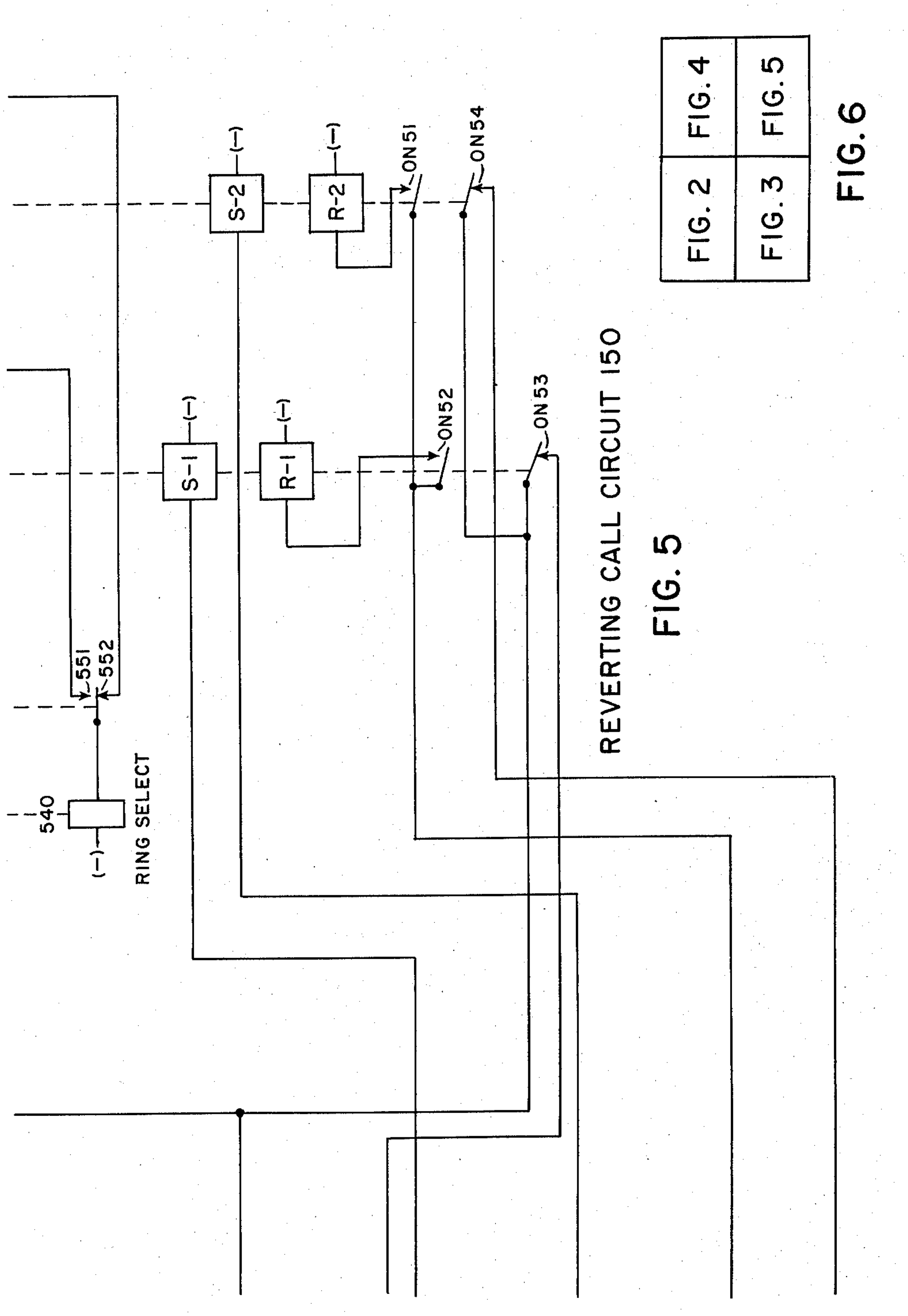

Fig. 1 shows, by block diagram, one example of a telephone system which is useful for explaining how the invention operates. In the system represented by Fig. 1, a subscriber (assumed to be calling from station A, line L11) may make different types of calls through conventional switching means, such as items numbered 103, 104 and 105, for example. Line circuit 101 responds to the completion of a loop when a subscriber at station A removes a receiver or handset. Thereafter, line circuit 101, line finder 103, and allotter 102, cooperate to find the calling line and to return dial tone for indicating that any suitable means for transmitting digit pulses, such as a dial (not shown), may be operated to transmit suitable digit indications representing the directory number of a called subscriber, such as subscriber E, for example. One digit may cause selector 104 to operate while second and third digits may cause connector 105 to operate, thereby seizing line circuit 108 which is individual to line L12.

The selection between subscribers on line L12 is made by the point of access to which connector 105 is driven. For example, Fig. 1 shows two points of access, 106 and 107, which are associated with the same line circuit 108. Quite obviously, at least two other terminals (not shown) are also associated with line circuit 108 since line L12 is shown as serving four subscribers. If ten subscribers, for example, were served by line L12, ten points of access similar to points 106 and 107 would be provided. Each point of access has associated therewith a fourth or control conductor which is connected to one of the strappings M1—M0 depending upon the particular mode of ringing current which is used to signal a called subscriber. For example, if, as has been assumed, connector 105 is directed to seize point of access 106, a ringing current is transmitted which is represented by strapping M8 and subscriber E is signaled. On the other hand, if connector 105 is directed to seize point of access 107, another subscriber is signaled according to the ringing current indicated by strapping M7.

Means is provided for extending reverting calls, as when a call is extended from station A to station C, on line L11, for example. A reverting call is extended as described above except that a calling subscriber dials a suitable prefix digit to operate selector 104 to seize reverting call circuit 150 over conductors T, R and S. Thereafter, the calling subscriber dials a digit for selecting his own ringing current, and responsive thereto minor switch MS-1 is operated to select a particular set of terminals. Then, the calling subscriber dials a digit for selecting the called party's ringing current and minor switch MS-2 is driven to select a particular set of terminals. Following this, the calling subscriber hangs up so that ringing current may be returned over conductors T and/or R, selector 104, finder 103, line circuit 101 and line L11 to signal called subscriber C. Since subscriber A has hung up and since the ringers for subscriber stations A and C are shown as connected to opposite sides of the line, it is desirable also to ring calling subscriber A to indicate when subscriber C answers.

In greater detail, the loop across conductors L11 is opened responsive to restoration of a receiver or handset by calling subscriber A. Responsive thereto, a ground (+) potential is applied (by means not shown in Fig. 1) to a conductor designated "Start" for initiating the operation of common control circuit 170 and ringing control circuit 160. At the beginning of a signaling cycle, common control circuit 170 applies a ground (+) potential to the conductor designated "Pick-up," thereby operating pick-up relay 310. Upon operating, relay 310 closes contacts 211 to connect ring control relay 450 to the conductor designated "Reverse ground."

During portions of signaling cycles, common control circuit 170 applies suitable marking potentials to the conductor designated "Reverse ground." Responsive thereto, ring control relay 450 operates to conect minor switch MS-1 to control the application of ringing current to the line for signaling a calling subscriber. During other portions of signaling cycles, common control circuit 170 does not apply any marking to the conductor designated "Reverse ground," ring control relay 450 does not operate and minor switch MS-2 is connected to control the application of ringing current to the line for signaling a called subscriber. Simultaneously with the markings which are transmitted over the conductor designated "Reverse ground," markings are extended in time sequence through ringing control circuit 160 to strappings M1-M0. A coincidence, with respect to time, between markings transmitted through strappings M1-M0 and over the conductor designated "Reverse ground" causes relays 420 and 450 either to operate or not to operate selectively depending upon the positions to which the two minor switches have been driven. If reversing relay 420 operates, ringing current is transmitted over conductor T via contacts 422. Otherwise, ringing current is transmitted over conductor R via contacts 423.

Two distinct modes of ringing current are provided further to select between subscribers that are to be signaled. For example, if ring select relay 540 operates responsive to markings extended through the minor switches, contacts 442 close to extend ringing current from one of the conductors designated "Signaling generator" while if ring select relay 540 does not operate, another mode of ringing current is selected by contacts 441.

Thus, it is seen that any of many combinations of signaling currents may be selected to signal both the calling and called subscribers individually depending upon the settings of the minor switches.

As will be explained later in detail, differentially wound ring relay 430 is arranged to release during portions of signaling cycles when calling subscribers are normally signaled, if the settings of minor switches MS-1 and MS-2 indicate that ringers for both the calling and called subscribers are connected to the same side of the line.

DETAILED DESCRIPTION

It is thought that a more complete understanding will result from the following description of reverting call circuit 150 as it is shown in detail in Figs. 2-5, inclusive.

*Seizure.*—Means is provided for seizing reverting call circuit 150 responsive to a prefix digit at which time a preceding circuit, not shown, completes a loop across conductors T and R (Fig. 2) thereby operating calling bridge relay 230 over a circuit which may be traced from ground (+) through the upper winding of calling bridge relay 230, contacts 221, conductor T, a loop extending through preceding circuits, conductor R, contacts 223, and the lower winding of calling bridge relay 230 to (−) battery. Responsive to the operation of calling bridge relay 230, contacts 331 close to operate release delay relay 340 over an obvious circuit. Contacts 331 also close a circuit to operate primary assist relay 350, as follows: (−) battery, the upper winding of relay 350, rest contacts 361, 352 and 331 to ground (+). Relay 360 operates over a circuit that may be traced from (−) battery through the lower winding of secondary assist relay 360, contacts ON54, ON53, 361, 352 and 331 to ground (+).

When release delay relay 340 operates, contacts 241 close to extend a busy and holding ground marking from contacts 281 to sleeve conductor S. Contacts 342 close in preparation for digit pulsing which is to follow, and contacts 343 open to prevent any premature releases. Contacts 341 close to apply master ground—a potential which holds most of the equipment operated and which, if removed, causes reverting call circuit 150 and its components to release.

When primary assist relay 350 operates, its original operating circuit is opened at contacts 352; however, it has already locked over a circuit which may be traced from (−) battery through the upper winding of primary assist relay 350, off-normal contacts ON53, and operated contacts 341 to master ground (+). Contacts 351 and 353 have no effect at this time. Contacts 354 close to complete part of a pulsing circuit and thereby prepare for operating minor switch MS-1 and for causing relay 350 to mark the end of a first digit pulse train, as explained below.

When secondary assist relay 360 operates, contacts 361 open thereby breaking still another point in the circuit over which primary assist relay 350 and secondary assist relay 360 originally operated. However, secondary assist relay 360 holds over a circuit, as follows: (−) battery, the lower winding of secondary assist relay 360, off-normal contacts ON54, and operated contacts 341 to master ground (+). Contacts 362 and 363 operate to extend the pulsing circuit to minor switch MS-1.

Reverting call circuit 150 is now ready to receive digit pulses and nothing further happens until the calling subscriber dials.

*Digit pulses.*—Means is provided for receiving and storing information that the calling subscriber may transmit. The calling subscriber dials first his own ringing digit and then the called party's ringing digit which are transmitted in the form of open or break periods in the loop which is completed across conductors T and R. Calling bridge relay 230 is designed to restore and reoperate responsive to each of these breaks or open loop pulses. Each time that relay 230 restores, contacts 331 open to de-energize release delay relay 340 which, however, continues to hold due to its own slow release characteristics. Also responsive to each time that calling bridge relay 230 releases responsive to a digit pulse, contacts 332 close to extend a ground (+) marking to operate minor switch stepping magnet S–1 over the circuit extending from (−) battery through the winding of stepping magnet S–1, operated contacts 354, 363, 342 and released contacts 332 to ground (+). Each time that stepping magnet S–1 operates, brushes MS–1*a*, MS–1*b*, MS–1*c* and MS–1*d* are driven one step further into an associated bank of contacts.

The mechanism of the minor switch MS–1 (not shown) is designed so that off-normal contacts ON52 and ON53 operate responsive to its first step to break the circuit over which primary assist relay 350 has been holding, namely: from (−) battery through the upper winding of relay 350, off-normal contacts ON53, and contacts 341 to master ground (+). Thereafter, primary assist relay 350 remains in an operated condition throughout the receipt of a digit pulse train due to its own slow release characteristics and pulse-like energizing current extended over the circuit that may be traced from (−) battery through the lower winding of relay 350, operated contacts 354, 363, 342 and rest contacts 332 to ground (+).

After receipt of a complete digit pulse train, calling bridge relay CB ceases to pulse; release delay relay 340 is held by the ground (+) potential applied at contacts 331; primary assist relay 350 restores after its slow release time interval; and the circuit is ready to receive the next digit pulse train.

When primary assist relay 350 restores, contacts 355 close to extend the pulsing circuit from ground (+) through contacts 332, 342, 363, 355 and the winding of stepping magnet S–2 to (−) battery. The stepping circuit is magnet S–1 is opened at contacts 354.

Calling bridge relay 230 is pulsed in accordance with the second digit pulse train which is transmitted by the calling subscriber to indicate the ringing code of the called subscriber. As before, contacts 331 pulse; however, release delay relay 340 continues to hold due to its slow release characteristics. Each time that contacts 332 close a circuit is completed to operate stepping magnet S–2 and drive wipers MS–2*a*, MS–2*b*, MS–2*c* and MS–2*d* into their associated banks of contacts. On the first step, off-normal contacts ON51 and ON54 operate. Responsive to operation of contacts ON51, release magnet R–2 is connected to prepare the switch for restoration at the end of the call. The holding circuit to the lower winding of secondary assist relay 360 is broken at off-normal contacts ON54, thereby causing secondary assist relay 360 to depend for continued operation upon the pulsing of calling bridge relay 230 as it repeats digit pulses, the circuit being traced from (−) battery through the upper winding of secondary assist relay 360, rest contacts 355, operated contacts 363, 342, and rest contacts 332 to ground (+). At the end of the digit pulse train, calling bridge relay 230 ceases to pulse. Contacts 332 stand open for a period which is longer than the slow release time of secondary assist relay 360, and it releases.

Responsive to the release of secondary assist relay 360, contasts 361 close thereby reoperating primary assist relay 350 over the circuit which may be traced from (−) battery through the upper winding of relay 350, rest contacts 361, 352, and 331 to ground (+). Upon operating, primary assist relay 350 completes a locking circuit for itself which extends from (−) battery through the upper winding of primary assist relay 350, rest contacts 361, operated contacts 351, and contacts 341 to ground (+). Secondary assist relay 360 does not reoperate since its original circuit is now open at contacts ON54. A circuit is prepared for switchthrough relay 320 when primary assist relay 350 closes its contacts 353.

Briefly, in review of the call that is being described, thus far the calling subscriber has dialed a prefix digit to seize reverting call circuit 150, has dialed ringing digits designating the signaling currents of both the calling and called subscribers, and the circuit is standing ready to complete the call; however, until the calling subscriber hangs up, it is impossible to ring out over the called line since both the calling and called lines are the same.

*Signaling.*—Certain assumptions are made for the purpose of explaining how reverting call circuit 150 operates as it extends signaling current over tip and ring conductors T and R, respectively. First, it is assumed that minor switch MS–1 is standing on the set of terminals numbered "3" and that minor switch MS–2 is standing on the set of terminals numbered "6." Second, it is assumed that common control circuit 170 is arranged to apply ground (+) potential to the conductor designated "Reverse ground" when signaling current is applied to the calling-called line to signal the calling subscriber; whereas, no ground (+) marking is applied when the called subscriber is signaled. Third, it is assumed that ringing control circuit 160 is arranged so that ground pulses are applied cyclically, in time sequence, to conductors M1, M2, M3 and M4, each of which designates a time for signaling a single party line subscriber. Fourth, it is assumed that a plurality of modes of ringing current are applied cyclically to the two conductors designated "Signaling generator," each particular mode of ringing current occurring during a time period that corresponds to a marking applied to a particular one of the conductors M1 to M4. The two "Signaling generator" conductors are provided in opposite polarity thereby doubling the number of modes of ringing current that would otherwise be available. Thus, telephones on a party line may be rung when a combination of events is such that various markings coincide with a particular mode of ringing current to designate an individual telephone that is to be signaled.

Calling subscribers are instructed to hang up after having dialed the digits which designate the signaling current of both the calling and called lines. Responsive thereto, a loop which had been completed across conductors T and R through preceding equipment (not shown) is broken so that calling bridge relay 230 restores. Contacts 331 open and release delay relay 340 is de-energized; however, it does not release since, as will be explained presently, a new circuit is completed to hold it before the expiration of its slow release time period. Contacts 332 close and switchthrough relay 320 operates over the circuit extending from (−) battery through the winding of relay 320, contacts 353, 382, 362, 342 and 332 to ground (+).

Responsive to the operation of switchthrough relay 320, contacts 322 close to re-energize release delay relay 340 over an obvious circuit; thereby holding it operated. Contacts 222 and 224 close to prepare a circuit for extending signaling current while contacts 221 and 223 open to disconnect calling bridge relay 230 from the tip and ring conductors T and R. Contacts 225 close to extend an additional marking and holding ground potential over conductor S to the preceding equipment. Contacts 226 close to prepare a circuit for controlling ring control relay 450. Contacts 227 close to apply a ground potential to a conductor designated "Start" thereby initiating the operation of common control circuit 170 and in turn of ringing control circuit 160. Contacts 228 close to prepare a circuit for measuring a permanent timing period as explained below. Contacts 321 close to connect pick-up relay 310 to be controlled by pulses which may be applied to the conductor designated "Pick-up."

Nothing further happens until the common control circuit applies a pick-up pulse to the conductor designated "Pick-up" whereupon a circuit is completed through contacts 312, 321, and the winding of relay 310 to (−) battery, thus causing it to operate.

Responsive to the operation of relay 310, contacts 311 close and pick-up relay 310 is locked in an operated condition depending upon master ground (+) which is applied through contacts 341, 311, 321, and the winding of relay 310 to (−) battery. Contacts 211 connect ring control relay 450 to be controlled over the conductor designated "Reverse ground." Contacts 213 prepare a circuit for extending ground (+) markings to various relays depending upon the positioning of the minor switch. According to the assumptions made above, minor switch MS–2 is setting with its wipers in engagement with its sixth set of terminals. Therefore, when no marking is applied to the "Reverse ground" conductor and ring control relay 450 is in its released position, a circuit may be traced for operating reversing relay 420 as follows: (−) battery, the winding of relay 420, rest contacts 455, the sixth terminal and associated brush in bank MS–2*c*, and contacts 213 to ground (+). Relay 540 is operated over a circuit which may be traced from (−) battery through the winding of relay 540, rest contacts 552, the sixth terminal in bank MS–2*d*, and an associated wiper to contacts 213 and ground (+). Also responsive to the operation of pick-up relay 310, contacts 212 close to place ring relay 430 under the control of markings extended over bank MS–2*a*. It is noted that the lower winding of ring relay 430 is connected directly to bank MS–1*b* which is unmarked since contacts 453 are open. This feature will be explained later.

During one portion in a cycle, common control circuit 160 applies a marking potential to the conductor marked "M4" and a circuit is completed through the terminals designated "6" in bank MS–2*a*, an associated wiper, contacts 452, 212, 283, and the upper winding of ring relay 430 to (−) battery. Responsive to the operation of ring relay 430, contacts 431 and 432 operate thereby disconnecting the (−) battery marking which is applied through lamp L41 and extending a particular mode of ringing current from the conductor designated "(+) Signaling generator" via contacts 442, 432, lamp L41, contacts 422, 222, conductor T, preceding equipment and a signaling device at called station C to ground, as shown in Fig. 1. After a period of time, ringing control circuit 160 removes the ground (+) marking from conductor M4 and ring relay 430 releases to discontinue the application of signaling current that is being applied to conductor T.

Means is also provided for signaling a calling subscriber under the influence of switch MS–1. More particularly, common control circuit 170 continues through its cycle and applies a ground (+) potential to the conductor designated "Reverse ground." Responsive thereto, relay 450 is operated over a circuit through contacts 211, 226, 282, and the winding of ring control relay 450 to (−) battery. At a particular time, ground (+) potential is extended over conductor M1 through terminal "3" in bank MS–1*a*, an associated wiper, contacts 451, 212, 283, and the upper winding of ring relay 430 to (=) battery whereupon relay 430 operates. Relays 420 and 540 do not operate since neither bank MS–1*c* nor bank MS-1*d* ins marked on terminal "3." Therefore, the particular mode of signaling current that is applied simultaneously with the marking on conductor M1 is extended from the conductor designated "(−) Signaling generator" through contacts 441, 432, the filament of lamp L41, contacts 423, 224, conductor R, preceding equipment and a signal device at calling station A to ground, as shown in Fig. 1.

The ringing control circuit 160 continues to operate through its cycle and applies ground (+) markings to conductors M2 and M3; however, there is no effect since the positions to which minor switches MS–1 and MS–2 have been stepped indicate that the particular modes of ringing current that are applied at these times are not utilized during this particular call. After control circuits 160 and 170 complete a cycle, conductor M4 is marked again and the above described signaling operations are repeated.

The cyclic ringing of the calling and called subscribers continues either until one of them answers or until a predetermined time period has elapsed as indicated by operation of permanent time relay 410 (explained below), in which case, ringing current is automatically removed from the line. Only four conductors M1 through M4 have been shown to provide a simplified drawing and to facilitate an explanation of the invention; however, this is not to be understood as limiting the invention. For example, many different signaling conditions could be controlled by each of the minor switches. Thus, the invention provides maximum flexibility of signaling conditions.

*Answer.*—When either the calling or called party responds to the application of signaling current by removing a receiver or handset, a loop (not shown) is completed across conductors T and R thereby operating ring trip relay 270. The circuit over which it operates depends upon whether ringing is being applied to the calling or called side of the line at the time of answer. For purposes of explanation, it is assumed that the call is answered at a time when relay 420 is unoperated.

Upon restoration of ring relay 430 the tripping circuit may be traced from (−) battery through contacts 431, the filament of lamp L41, contacts 423, 224, conductor R, a loop through hookswitch contacts (not shown), conductor T, contacts 222, 421, and the winding of ring trip relay 270 to ground (+). Responsive to the operation of relay 270, contacts 371 close and relay 380 is operated over a circuit which may be traced from (−) battery through the winding of relay 380, contacts 371 and 341 to master ground (+).

Ring assist relay 380 first operates its "X" or preliminary contacts 381 to complete a circuit from (−) battery through the winding of relay 380, contacts 381 and 341 to ground (+) for completing a holding circuit which is effective after ring trip relay 270 has released to open contacts 371. Contacts 382 open thereby releasing switchthrough relay 320 which had been holding over the circuit that may be traced from (−) battery through the winding of switchthrough relay 320, operated contacts 353, rest contacts 382 (now open), rest contacts 362, operated contacts 342 and rest contacts 332 to ground (+). Contacts 284 open to disable permanent time relay 410, which has not operated as yet. Contacts 283 open to disable ring relay 430 and contacts 282 open to disable ring control relay 450. Contacts 281 open to remove the holding and busy marking ground (+) potential applied to sleeve conductor S.

The subject invention provides means for releasing reverting call circuit 150 during conversation. Talking battery must, therefore, be furnished from some preceding circuit, such as a line circuit, finder, or selector, for example. If it should be desirable to return talking battery from reverting call circuit 150, it is only necessary to substitute a solid ground (+) marking for contacts 225.

When switchthrough relay 320 restores, contacts 225 open to remove the last busy and holding marking from sleeve conductor S thereby releasing the preceding equipment, contacts 221—224 restore to their normal position to reconnect calling bridge relay 230 to conductors T and R. Contacts 227 open to stop control circuits 160 and 170. Contacts 321 open to release pick-up relay 310 while contacts 322 open to restore release delay relay 340 which had been holding over an obvious circuit. Ring trip relay 270 restores when contacts 222 and 224 open, while release delay relay 340 remains operated for a brief period of time due to its own slow release characteristics. Following the restoration of relay 340, contacts 343 close thereby connecting the release alarm conductor through off-normal contacts ON52 to release magnet R–1 and through off-normal contacts ON51 to release magnet R–2. Each of the release magnets operates and the two minor switches MS–1 and MS–2 release. Primary assist relay 350 restores when its circuit is open responsive to release of switchthrough relay 320 which opens contacts 322.

*Permanent timing.*—Means is provided for releasing the reverting call circuit if neither the calling nor called party answers to terminate ringing within a predetermined time period. First, when the calling subscriber hangs up, switchthrough relay 320 operates in the manner explained above. Responsive thereto, contacts 228 operate and connect "Time pulse 1" conductor to permanent time relay 410 over the following circuit: (—) battery, the winding of relay 410, contacts 284, 412, 228, and "Time pulse 1" conductor. After a predetermined interval of time, the common interrupter applies a ground potential to the conductor marked "Time pulse 1" thereby operating permanent time relay 410. Responsive thereto, contacts 412 open and 411 close so that relay 410 is locked operated over a circuit which may be traced from (—) battery through the winding of permanent time relay 410, contacts 284, 411 and 341 to ground (+). Permanent time relay 410 also closes its contacts 413 thereby connecting the conductor designated "Time pulse 2" through contacts 413, 285, and the winding of relay 380 to (—) battery. Thereafter, common control circuit 160 applies a ground pulse to the conductor marked "Time pulse 2" and ring assist relay 380 operates. Thereafter, the circuit releases in the manner described above in the section entitled "Answer."

*Signaling calling and called subscribers over the same side of the line*

The next function that is described involves calls where the signal devices of both the calling and called subscribers are connected to the same side of the line, so that the calling subscriber may receive a signal responsive to the same currents that are transmitted to signal the called subscriber. It is assumed that minor switch MS–1 is now standing with its brushes in connection with contacts "1" while minor switch MS–2 is standing with its brushes in connection with contacts "5." If the condition of common control circuit 170 (Fig. 1) is such that ground is applied to the conductor marked "Reverse ground" at the time that pick-up relay 310 operates, ring control relay 450 operates and connects the lower winding of ring relay 430 to ground over a circuit which may be traced from (—) battery, through the lower winding of ring relay 430, contacts 1 in level MS–1*b*, contacts 5 in level MS–2*b*, an associated brush, contacts 453, 451, a brush and contacts 1 in level MS–1*a*, conductor M1, and a ground potential which is applied by the ringing control circuit 160. Ring relay 430 is differentially energized at this time in view of the circuit just traced through its lower winding and further in view of a circuit which may be traced from (—) battery through the upper winding, contacts 283, 212, 451, contacts 1 in bank MS–1*a* and a ground (+) potential applied to conductor M1 by ringing control circuit 160. In view of the differential energization, ring relay 430 does not operate, contacts 432 do not close, and signaling current is not transmitted over the line for signaling the calling subscriber.

Later, during the cycle of operation of common control circuit 170, ground is removed from the conductor designated "Reverse ground," ring control relay 450 restores and closes contacts 452 thereby connecting conductor M4 to control ring relay 430, the circuit being traced from (—) battery through the upper winding of ring relay 430, contacts 283, 212, 452, a brush and contacts 5 in bank MS–2*a* to conductor M4. When ringing control circuit 160 applies ground (+) to conductor M4, a circuit is completed through the upper winding of ring relay 430 which operates. If an attempt is made to trace a circuit through the lower winding of ring relay 430, it is seen that open contacts 453 keep ring relay 430 from being differentially energized. Therefore, signaling current is transmitted over the line to signal the called party in the manner described above in the section entitled "Signaling." Hence, when ringers of both the calling and called subscribers are connected to the same side of the line, means is provided for signaling the called subscriber only.

While the foregoing specification and accompanying drawings have shown and described a specific embodiment of the invention, other modifications may readily occur to those skilled in the art. Therefore, the invention is not limited to the specific arrangement shown and described, and the appended claims are intended to cover all modifications within the spirit and scope of the invention.

What is claimed is:

1. In a telephone system, party lines each serving a plurality of subscribers, means for controlling the extension of reverting calls between subscribers served by said party lines, means associated with a plurality of said control means for extending markings and a plurality of signaling currents in time sequence to said control means, each of said markings designating particular subscribers served by said party lines, means responsive to control signals transmitted from calling subscribers for selecting between said markings, and means responsive to said selecting means for transmitting particular ones of said signaling currents to said party lines during periods in said time sequence represented by said selected markings.

2. In a telephone system, party lines each serving a plurality of subscribers, reverting call means for controlling reverting calls extended between subscribers served by said party lines, means for extending reverting calls from calling party lines to said reverting call means, means associated with a plurality of said reverting call means for extending markings and a plurality of signaling currents in time sequence to said reverting call means, each of said markings designated subscribers served by said party lines, means responsive to control signals transmitted from said calling party lines for selecting between said markings, and means responsive to said selecting means for transmitting selective ones of said signaling currents back through said call extending means to said calling party line during periods in said time sequence represented by said selected markings.

3. In a telephone system, party lines each serving a plurality of subscribers, reverting call means for controlling reverting calls extended between subscribers served by said party lines, means responsive to prefix digits transmitted by calling subscribers for extending reverting calls from calling subscriber lines to said reverting call means, means associated with a plurality of said reverting call means for extending markings and a plurality of signaling currents in time sequence to said reverting call means, each of said markings representing subscribers served by said party lines, means in said reverting call means for registering the values of current selecting digits identifying calling and called subscribers, means responsive to said last named means for selecting certain of said markings according to said registered values, and means for transmitting certain of said signaling currents back through said call extending means to said calling party line during periods of said time sequence represented by said selected markings.

4. In a telephone system, subscriber lines some of which serve a plurality of subscribers, reverting call means comprising a plurality of register means for controlling reverting calls, means responsive to prefix digits transmitted by calling subscribers for extending reverting calls from calling subscriber lines to said reverting call means, means associated with a plurality of said reverting call means for extending markings and a plurality of signaling currents in timed sequence to said reverting call means, each of said markings representing different subscribers served by said subscriber lines, means for operating said registering means to store the values of current selecting digits transmitted by said calling subscribers to identify calling and called subscribers, means responsive to said last named means for selecting certain ones of said markings according to said stored values, and means for transmitting selective ones of said signaling currents to said calling subscriber lines during periods in said time sequence represented by said selected markings.

5. In a telephone system, a plurality of party lines, reverting call means comprising a plurality of minor switches, means responsive to prefix digits transmitted over said lines for extending reverting calls from calling lines to said reverting call means, means for extending markings in timed sequence to said reverting call means, each of said markings representing different subscribers served by said lines, means for operating said minor switches to select certain of said markings responsive to current selecting digits transmitted over said calling lines, means for transmitting in time sequence simultaneously with said markings a plurality of modes of signaling current to said reverting call means, and means for transmitting to said calling lines the particular signaling currents that occur during periods in said time sequence represented by said selected markings.

6. In a telephone system, party lines each comprising at least one control conductor, means for extending calls between said party lines, means common to said telephone system for extending markings in time sequence, means for extending a plurality of signaling currents in said time sequence, said signaling currents being adapted to signal individual subscribers served by said party lines, means for associating said markings with said control conductors on an individual basis depending upon which of said signaling currents is required to signal a called party, means responsive to said last named means for transmitting selective ones of said signaling currents during periods of said timed sequence represented by said associated markings, means for controlling the extension of reverting calls between subscribers served by said party lines, means in said reverting call extending means for selecting between said markings responsive to control signals transmitted over said party lines by calling subscribers, and means responsive to said selecting means for transmitting selective ones of said signaling currents from said reverting call extending means to said party lines during periods in said time sequence represented by said selected markings.

7. In a telephone system, subscriber lines each comprising at least a control conductor, some of said subscriber lines being adapted to give party line service, means for extending calls between said subscribed lines, means common to said telephone system for extending a plurality of markings in timed sequence, means for extending a plurality of modes of signaling current in said timed sequence, means for selectively signaling each of said subscribers responsive to individual modes of said signaling currents, means for selectively associating said markings with said control conductors on an individual basis depending upon which of said modes of signaling currents is required to signal a particular subscriber, means responsive to said selective association of said markings for transmitting signaling currents that occur during periods in said timed sequence represented by said associated markings, means for establishing reverting calls between subscribers served by said lines giving party line service, means responsive to prefix digits for giving calling subscribers access to said reverting call establishing means via a calling portion of said call extending means, means in said reverting call establishing means for selecting between said markings responsive to control signals transmitted from calling subscribers, and means responsive to said marking selecting means for transmitting selective ones of said modes of signaling currents from said reverting call establishing means to the line that serves said calling subscribed via said calling portions during periods in said timed sequence represented by said selected markings.

8. In a telephone system, subscriber lines comprising at least one control conductor, some of said subscriber lines being adapted to give party line service, means for extending calls between said subscriber lines, means common to said telephone system for extending a plurality of markings in timed sequence, means for extending a plurality of modes of signaling currents in said timed sequence, means for signaling individual subscribers responsive to individual modes of said signaling currents, means for selectively associating said markings with said control conductors on an individual basis depending upon which mode of said signaling currents is required to signal a particular subscriber, means responsive to said selective association of said markings for transmitting particular modes of signaling current that occur during periods in said timed sequence represented by said associated markings, means for establishing reverting calls between subscribers served by said party lines, means responsive to prefix digits for giving calling subscribers access to said reverting call establishing means via a calling portion of said call extending means, means in said reverting call establishing means for registering ringing digits transmitted by said calling subscribers over said calling portion, means responsive to said last named means for selecting between said markings according to the value of said registered digits, and means responsive to said selecting means for transmitting particular modes of said signaling currents from said reverting call establishing means to said party lines via said calling portion during periods in said timed sequence represented by said selected markings.

9. In a telephone system, subscriber lines comprising at least one control conductor, some of said subscriber lines being adapted to give party line service, means for extending calls between said subscriber lines, means common to said telephone system for providing a plurality of markings in timed sequence, means for providing a plurality of modes of signaling currents in said timed sequence, means for signaling individual ones of said subscribers responsive to individual modes of said signaling currents, means for selectively associating said markings with said control conductors on an individual basis depending upon which of said modes of signaling currents is required to signal particular parties, means for transmitting signaling currents that occur during periods in said timed sequence represented by said associated markings, means for controlling the establishment of reverting calls between subscribers served by said party lines, means responsive to prefix digits for giving calling surscribers access to said reverting call establishing means via a calling portion of said call extending means, means in said reverting call establishing means comprising minor switches for registering ringing digits transmitted by calling subscribers over said calling portion, said means for providing markings being connected to terminals in banks of said minor switches, and means for transmitting selective ones of said modes of signaling current from said reverting call establishing means to said party lines via said calling portion during periods in said timed sequence represented by the one of said markings that is selected according to positioning of said minor switch as it registers said ringing digits.

10. The telephone system of claim 9 wherein said digits registered in said minor switches comprise ringing digits individual to calling and called subscribers served by a party line utilized in the establishment of reverting calls.

11. The telephone system of claim 10 and means for effectively canceling one of said ringing digits when ringers for both calling and called subscribers are operated responsive to both ringing digits.

No references cited.